June 17, 1952   F. W. CLOEDY ET AL   2,600,480
FILTER UNIT
Filed Sept. 10, 1947

INVENTORS
FREDERICK W. CLOEDY
CLARENCE E. HOLT
BY
*George R. Erioson*
ATTORNEY

Patented June 17, 1952

2,600,480

UNITED STATES PATENT OFFICE 2,600,480

FILTER UNIT

Frederick W. Cloedy, Sappington, and Clarence E. Holt, Richmond Heights, Mo., assignors to Carter Carburetor Corporation, St. Louis, Mo., a corporation of Delaware Application September 10, 1947, Serial No. 773,160

1 Claim. (Cl. 210—164)

This invention relates to fluid filters and has particular reference to improvements in the structural assembly of a filter device of unit character suitable for use in automotive fuel supply lines and the like.

The principal object of the invention is to provide a filter unit which is characterized by relatively few parts and an improved and greatly simplified structural assembly, facilitating comparatively simple and inexpensive manufacture of the unit.

Other objects and advantages of the present invention will appear readily from the following description of a presently preferred embodiment of the filter unit as such is illustrated in the accompanying drawing, wherein.

While the improved filter unit is here shown (Fig. 1) in a fuel supply passage of an automotive carburetor, such application thereof is to be considered as exemplary only, as one or more of the units may be utilized at other suitable points in the fuel supply conduit system leading to the carburetor. Moreover, the unit is capable of being employed in other than automotive fuel systems, as in any fluid system wherein a filter of the unit character shown may be desirable or required.

Figure 1:
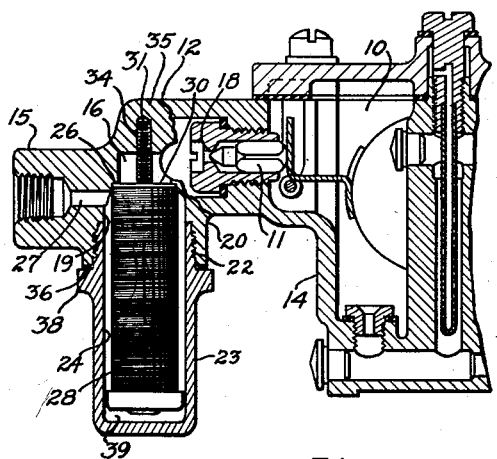
Fig. 1 is a sectional view, in fragmentary part, of an automotive carburetor showing the filter unit in application thereto.

With reference first to Fig. 1, an automotive carburetor is shown only in fragmentary part, the portion illustrated including the carburetor fuel float chamber 10, a float-controlled valve assembly, generally indicated by the numeral 11 and which may be of conventional character, and a boss or extension 12 of the float chamber casing 14, providing a nipple 15 to which the fuel supply line or conduit (not shown) is connected.

The boss 12 provides a chamber 16 communicating directly with the float valve seat 18 and in line with the chamber is an aperture 19 through a side wall 20 of the boss. A portion of the apertured wall is internally threaded to receive the threaded end 22 of a removable cup-like closure member 23, the latter defining with the aperture in the wall 20, a chamber 24 in line with and extending from the chamber 16. Provided in the boss at the juncture of chambers 16 and 24 is an annular shouldered seat 26 and opening to chamber 24 adjacent the seat 26 is a fuel inlet passage 27 in nipple 15.

Positioned in chamber 24 is a filter unit 28 embodying the features of the present invention presently to be described, the unit being disposed with its discharge or outlet end 30 in fluid-tight seating against seat 26, and retained in place by screw-threading the end 31 of a rod or spindle element 32 (Fig. 2) of the unit, in a threaded recess 34 provided therefor in the wall portion 35 of boss 12. The unit thus separates the chambers 16 and 24, thereby constraining the fuel entering through the nipple passage 27, to pass into chamber 24 about the filter unit, thence through the filter element of the unit and out through the filter discharge end 30 into chamber 16, from whence the filtered fuel may enter the carburetor float chamber 10 whenever the float valve 11 is open.

The cup-like closure 23 is, of course, assembled to the boss after the filter unit is firmly secured in place and in order to avoid fuel leakage externally of the closure at the juncture thereof with the apertured wall 20, a sealing ring or gasket 36 is provided between the wall and a flange 38 on the closure. Moreover, the lower end of the closure forms a sediment sump 39, and since the closure is readily removable without disturbing the assembly position of the filter unit, it may be removed at intervals for sediment clean-out of the sump. Also, upon detachment of the closure, the filter unit 28 is thereby fully exposed and accessible as for inspection of its condition or for replacement by a new filter unit.

Figure 2:
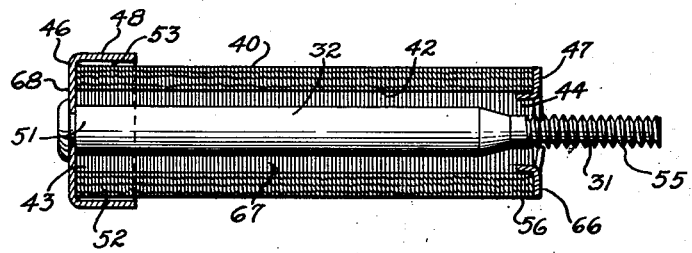
Fig. 2 is a somewhat enlarged view in longitudinal section of the improved filter unit.
Figure 3:
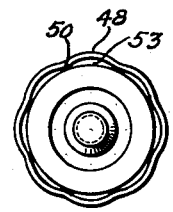
Fig. 3 is an end view of the unit as viewed from the threaded end of the supporting rod or spindle, wherein the filter tube mounting element provided for such end of the rod is removed in order to reveal the concentric relationship of the spindle and filter tube.
Figure 5:
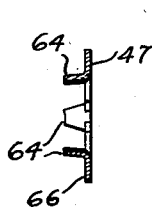
Fig. 5 is a transverse sectional view of the mounting element as taken along the line 5—5 in Fig. 4.
Figure 4:
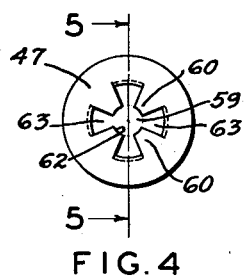
Fig. 4 is a view in plan of a mounting element of novel character, which in unit assembly, is engaged with the threaded end of the rod or spindle shown in Fig. 2 in supporting relation to the filter tube.

Figs. 2 to 5 illustrate the filter unit 28 in respect to the features of structural assembly thereof forming the subject matter of the present invention. As shown in Figs. 2 and 3, the filtering element 40 of the unit is of tubular form providing a central longitudinal passage or bore 42 open at its ends 43 and 44. Although the present invention is not concerned with the material and character of construction of the element 40 per se, apart from its tubular form, it may be noted here that the element may be comprised of suitable filter paper, formed spirally and compressed to afford the tubular element shown, characterized by a sufficient rigidity to maintain its shape in unit assembly and in filtering use.

Filter element 40 is supported by members 46 and 47 upon rod or spindle 32 arranged longitudinally in the bore or passage 42 of the element. Member 46 is of generally cup-shape having the cup flange or wall 48 of scallop form, as appears in Fig. 3, affording internal projections 50 for a purpose to appear. The member is secured upon the end 51 of spindle 32, as by riveting the spindle end to the central portion of the cup member in the manner shown. One end portion 52 of the filtering element is received in the cup member in lateral contact with the cup wall projections 50, the cup member thereby externally embracing the filter end 52, but affording by means of end passages 53 fluid access to such end of the filter element for filtering flow therethrough. The cup member 46 further as appears, closes the otherwise open end 43 of the filter element passage 42.

The opposite end portion 31 of the spindle 32 is of reduced diameter and threaded at 55 along the major extent of its length, such threaded end projecting forwardly beyond the end 56 of the filter tube 40. Threaded on the end 31 of the spindle is the element 47 provided as a relatively thin disc member centrally apertured at 59 to receive the spindle end and formed to provide substantially radial portions 60 each having its end margin 62 adapted to engage and follow the threads 55 on the spindle. Between the radial portions 60 are openings 63 defining discharge ports for the filter element, as will be referred to hereinafter, and extending laterally from one side of the disc are substantially equally spaced projections or tongues 64. The projections or tongues are preferably integral with the disc, being portions thereof out-struck from the central zone of the disc, the displaced portions thereby aperturing the disc to afford the openings 63. In unit assembly, the disc member is threaded upon the spindle end 31, into engagement of its outer marginal portion 66 with the end 56 of filter element 40, such as to effect a secure clamping of the element between the members 46 and 47. The disc as so positioned, has its lateral projections 64 engaged with the internal marginal portion of the filter element end 56, thereby serving in cooperation with the cup member 46 externally embracing the opposite end 52 of the element 40, to dispose the filter element concentrically of the spindle 32, as this appears in Figs. 2 and 3. The spindle being of a diameter less than the internal diameter of the filter element, defines with the bore 42 of the latter, an annular chamber 67 to receive the filtered fluid, as gasoline. Fluid discharge from the chamber 67 is here afforded through the ports 63 in the disc member in direct communication with the chamber (Fig. 2), these ports affording the sole outlet since the opposite end of the chamber is closed by the bottom or base wall 68 of the cup member 46.

It will appear now that the filter element 40 is here supported and structurally assembled in the unit, by but three elements, viz., the rod or spindle 32, the cup-shaped member 46 fixed to the rod, and the disc member threaded to the rod. The disc member, as well as the cup member, is well adapted for formation as by a single die-stamping operation upon sheet stock of metal or other suitable material, which thus facilitates ready and economical manufacture of these elements. Moreover, the relatively small number of parts and the described manner of assembly thereof in the unit, contribute materially to reduced handling and assembling costs. It is to be noted additionally, that by formation of the cup support 46 to afford the passages 53 for fluid access to the filter element end portion 52 within the cup, substantially the entire external surface of the element is exposed to the fluid to be filtered.

While but a single presently preferred embodiment of the invention is herein described and illustrated in the drawing, it is to be understood that all modifications thereof as come within the spirit and full intended scope of the appended claim are contemplated.

We claim:

A filter unit comprising a tubular filter element, a spindle extending longitudinally through said element and forming an annular fluid passage therein, a member on the spindle abutting one end of said element, and a sheet metal disk member with a central aperture threaded on said spindle and engageable with the opposite end of said element for clamping said element between said members, said second member having alternate inward, thread engaging tongues and lateral projections struck outwardly from the disk to form fluid passages communicating with said annular passage, said projections internally engaging said filter element and serving in cooperation with said first member to position said element substantially concentrically of said spindle.

FREDERICK W. CLOEDY.
CLARENCE E. HOLT.

REFERENCES CITED

The following references are of record in the file of this patent:

UNITED STATES PATENTS

| Number | Name | Date |
|---|---|---|
| 1,095,198 | Finch | May 5, 1914 |
| 1,643,299 | Furness | Sept. 27, 1927 |
| 1,908,925 | Semon et al. | May 16, 1933 |
| 1,917,203 | Heinz | July 4, 1933 |
| 2,047,298 | Tinnerman | July 14, 1936 |
| 2,125,435 | Erling | Aug. 2, 1938 |
| 2,126,938 | Williams et al. | Aug. 16, 1938 |
| 2,134,413 | Munoz | Oct. 25, 1938 |
| 2,308,865 | Davis | Jan. 19, 1943 |

OTHER REFERENCES

Pickard, Filtration and Filters, published in 1929, by Ernest Benn Limited, London; Bouverier House, E. C. 4, pp. 42-43 required.